United States Patent
Bourd et al.

(10) Patent No.: US 10,026,145 B2
(45) Date of Patent: Jul. 17, 2018

(54) RESOURCE SHARING ON SHADER PROCESSOR OF GPU

(71) Applicant: QUALCOMM Incorporated, San Diego, CA (US)

(72) Inventors: Alexei Vladimirovich Bourd, San Diego, CA (US); Maxim Kazakov, San Diego, CA (US); Chunhui Mei, San Diego, CA (US); Sumesh Udayakumaran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/377,498

(22) Filed: Dec. 13, 2016

(65) Prior Publication Data

US 2018/0165786 A1   Jun. 14, 2018

(51) Int. Cl.
  *G06T 1/20* (2006.01)
  *G06T 1/60* (2006.01)
  *G06T 15/00* (2011.01)

(52) U.S. Cl.
  CPC .............. *G06T 1/20* (2013.01); *G06T 15/005* (2013.01); *G06T 1/60* (2013.01); *G06T 2210/52* (2013.01)

(58) Field of Classification Search
  CPC .......... G06T 1/20; G06T 15/005; G06T 15/80; G06T 1/60; G06T 2210/52
  USPC .......................... 345/426, 501, 505, 530, 541
  See application file for complete search history.

(56) References Cited

U.S. PATENT DOCUMENTS

| | | | |
|---|---|---|---|
| 8,803,891 B2 | 8/2014 | Hartog et al. | |
| 8,842,122 B2 | 9/2014 | Nordlund et al. | |
| 9,250,953 B2 | 2/2016 | Kipp | |
| 9,396,032 B2 | 7/2016 | Nalluri et al. | |
| 2007/0091089 A1* | 4/2007 | Jiao | G06T 15/005 345/426 |
| 2011/0261063 A1* | 10/2011 | Jiao | G06F 9/3004 345/522 |
| 2013/0117760 A1 | 5/2013 | Cuadra et al. | |
| 2013/0155077 A1* | 6/2013 | Hartog | G06F 9/3851 345/506 |
| 2016/0260246 A1* | 9/2016 | Oldcorn | G06T 15/80 |
| 2016/0379337 A1* | 12/2016 | Tsai | G06T 15/005 345/522 |
| 2017/0069132 A1* | 3/2017 | Howson | G06T 1/20 |

* cited by examiner

*Primary Examiner* — Jacinta M Crawford
(74) *Attorney, Agent, or Firm* — Shumaker & Sieffert, P.A.

(57) ABSTRACT

Techniques for allowing for concurrent execution of multiple different tasks and preempted prioritized execution of tasks on a shader processor. In an example operation, a driver executed by a central processing unit (CPU) configures GPU resources based on needs of a first "host" shader to allow the first shader to execute "normally" on the GPU. The GPU may observe two sets of tasks, "guest" tasks. Based on, for example, detecting an availability of resources, the GPU may determine a "guest" task may be run while the "host" task is running. A second "guest" shader executes on a GPU by using resources that were configured for the first "host" shader if there are available resources and, in some examples, additional resources are obtained through software-programmable means.

27 Claims, 4 Drawing Sheets

RESOURCE SHARING ON SHADER PROCESSOR OF GPU

TECHNICAL FIELD

The disclosure relates to data processing and, more particularly, to resource sharing on a shader processor of a graphics processing unit (GPU).

BACKGROUND

Processing units, such as graphics processing units (GPUs), include processing elements and a general purpose register (GPR) that stores data for the execution of an instruction. In some examples, a processing element executes instructions for processing one item of data, and respective processing elements store the data of the item or the resulting data of the item from the processing in the GPR. An item of data may be the base unit on which processing occurs. For instance, in graphics processing, a vertex of a primitive is one example of an item, and a pixel is another example of an item. There is graphics data associated with each vertex and pixel (e.g., coordinates, color values, etc.).

There may be multiple processing elements within a processor core of the processing element allowing for parallel execution of an instruction (e.g., multiple processing elements execute the same instruction at the same time). A shader is a computer program that can utilize a parallel processing environment (e.g., shader processors) and have been used to perform graphics rendering techniques on two and three-dimensional models at various stages of the graphics processing pipeline. Examples of shaders include pixel (or fragment) shaders, used to compute color and other attributes of a pixel (or fragment); vertex shaders, used to control position, movement, lighting, and color, or a vertex; geometry shaders, used to generate graphics primitives; tessellation-related shaders (e.g., hull shaders and/or domain shaders that are used when subdividing patches of vertex data into smaller primitives; and compute shaders are used for computing other information (e.g., non-graphics data).

SUMMARY

In general, the disclosure describes techniques for allowing for concurrent execution of multiple different tasks and preempted prioritized execution of tasks on a shader processor. In an example operation, a driver executed by a central processing unit (CPU) configures GPU resources based on needs of a first "normal" or "host" shader to allow the first shader to execute "normally" on the GPU. The GPU may observe two sets of tasks, "normal" and "guest" tasks. Based on, for example, detecting an availability of resources, the GPU may determine a "guest" task may be run while the "normal" task is running. A second "guest" shader executes on a GPU by using resources that were configured for the first "normal" shader if there are available resources and, in some examples, additional resources are obtained through software-programmable means (e.g., a bindless mechanism).

In one example of this disclosure, a method for operating a graphics processing unit (GPU), the method comprising: allocating resources of a shader processor of the GPU for a first thread of a first shader based on a first resource footprint of the first shader; receiving information from a driver identifying a second shader; receiving an indication that a second resource footprint of the second shader is smaller than the first resource footprint of the first shader; determining whether one or more processing elements of the shader processor is available based on the resources configured for the first thread; and based on the determination that one or more processing elements are available and the indication that the second resource footprint is smaller than the first resource footprint, executing a second thread of the second shader using resources configured for the first thread of the first shader on the shader processor.

In another example, an apparatus comprising: a graphics processing unit (GPU), the GPU configured to store a first shader and a second shader and the GPU comprising a shader processor and a command processor, the command processor configured to: allocate resources of the shader processor for the first thread of a first shader based on a first resource footprint of the first shader; receive information from a driver identifying the second shader; receive an indication that a second resource footprint of the second shader is smaller than the first resource footprint of the first shader; and determine whether one or more processing elements of the shader processor is available based on the resources configured for the first thread; the shader processor configured to, based on the determination that one or more processing elements are available and the indication that the second resource footprint is smaller than the first resource footprint, execute a second thread of the second shader using resources configured for the first thread of the first shader.

In another example, a non-transitory computer-readable storage medium including instructions stored thereon that, when executed, cause at least one processor of to: allocate resources of a shader processor of the GPU for a first thread of a first shader based on a first resource footprint of the first shader; receive information from a driver identifying a second shader; receive an indication that a second resource footprint of the second shader is smaller than the first resource footprint of the first shader; determine whether one or more processing elements of the shader processor is available based on the resources configured for the first thread; and based on the determination that one or more processing elements are available and the indication that the second resource footprint is smaller than the first resource footprint, execute a second thread of the second shader using resources configured for the first thread of the first shader on the shader processor.

In another example, an apparatus for operating a graphics processing unit (GPU), the method comprising: means for allocating resources of a shader processor of the GPU for a first thread of a first shader based on a first resource footprint of the first shader; means for receiving information from a driver identifying a second shader; means for receiving an indication that a second resource footprint of the second shader is smaller than the first resource footprint of the first shader; means for determining whether one or more processing elements of the shader processor is available based on the resources configured for the first thread; and means for executing a second thread of the second shader using resources configured for the first thread of the first shader on the shader processor based on the determination that one or more processing elements are available and the indication that the second resource footprint is smaller than the first resource footprint.

The details of one or more examples are set forth in the accompanying drawings and the description below. Other features, objects, and advantages will be apparent from the description, drawings, and claims.

DETAILED DESCRIPTION

Figure 1:
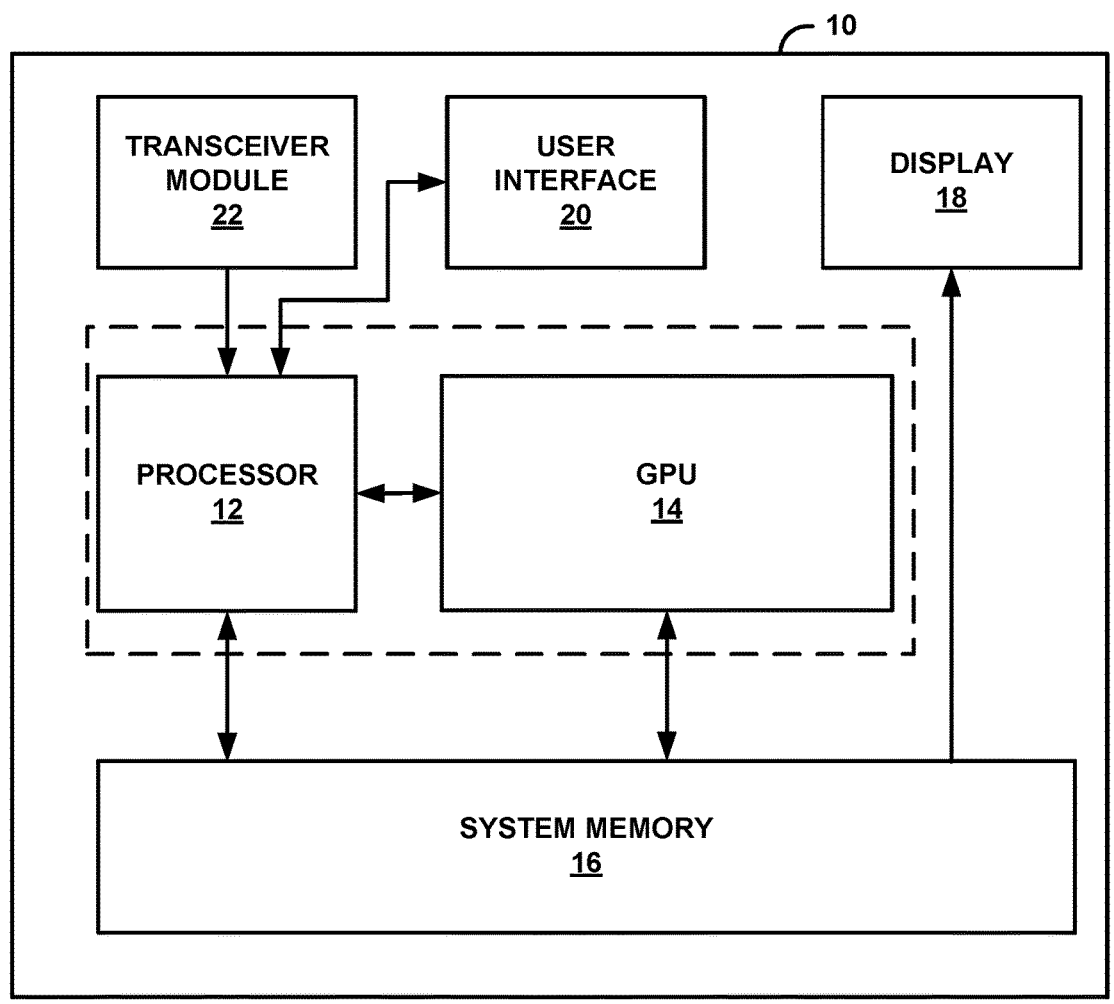
FIG. 1 is a block diagram illustrating an example device for processing data in accordance with one or more example techniques described in this disclosure.

Parallel processing units, such as graphics processing unit (GPUs) that are configured to perform many operations in parallel (e.g., at the same time or substantially the same time), include one or more processor cores (e.g., shader cores for a GPU) that execute instructions of one or more programs. For ease of description, the techniques described in the disclosure are described with respect to a GPU configured to perform graphics processing applications and/or general purpose GPU (GPGPU) applications. However, the techniques described in this disclosure may be extended to parallel processing units that are not necessarily GPUs or GPGPUs, as well as non-parallel processing units (e.g., ones not specifically configured for parallel processing).

A particular instruction executing on a particular processing element is referred to as a thread or a fiber. A group of threads may be referred to as a wave or warp. All of the processing elements together that execute a warp may be referred to as a vector processing unit, where each lane (e.g., processing element) of the vector executes one thread. Each processing element may be considered as executing a different thread because the data for a given thread may be different; however, the thread executing on a processing element may be the same instruction, of the same program, as the instruction executing on the other processing elements. In this way, the GPU may perform many tasks in parallel (e.g., at the same time).

A shader (or shader program) is a computer program that can utilize a parallel processing environment (e.g., shader processors). A draw command refers to one or more of a family of commands executed by a processing unit (e.g. a CPU) to a graphics application program interface (API) which interacts with a graphics processing unit (e.g. GPU) to draw (e.g. render) an object for display on a display device. A dispatch command refers to a one or more of a family of commands executed by a processing unit (e.g. a CPU) to a graphics API which interacts with a graphics processing unit (GPU) to execute non-display operations. Elements of a draw or dispatch command may execute redundant operations in an associated shader. In particular, a GPU may perform batch processing commands such as draw calls and dispatches. A command may instruct the GPU to use one or more shaders to process elements such as work items, pixels, and vertices. A shader may then be invoked for the element.

GPU architecture may be adapted from handing one synchronized queue of tasks to the simultaneous handling of multiple tasks with different priorities. The asynchronous nature of the queueing mechanism may provide advantages over a uniform synchronized task queue. It is often the case that an application has multiple concurrent tasks, each having its own time frame (e.g., different tasks having to be completed in different time periods).

For example, in a virtual reality (VR) application, time warping (also known as reprojection) is a technique that warps the rendered image before sending it to the display to correct for the head movement occurred after the rendering that may reduce latency, increase or maintain frame rate, and reduce judder caused missed frames (e.g., when frames take too long to render). Time warping operations may need to be processed at 120 frames per second (FPS) while rendering might be processed at 50-60 FPS, while physics simulation may need to be processed at 30 FPS. Even inside rendering loops, not everything may need to be updated at the same frequency. In an example, resources may be grouped together and organized by update frequency (in e.g., descriptor sets in the Vulkan API). In an example, time warping operations may be given a higher priority than other operations (e.g., shaders) and preempt them. In another example, time warping may be run concurrently with other operations (e.g., shaders) on a GPU.

The support for multiple asynchronous queues with different priorities may be realized through either kernel mode driver (KMD) task schedulers, or programmable command processors that represent the front end of the GPU. The KMD task scheduler may run on the CPU and may observe all task queues and decide which single task out of those queues will occupy whole GPU when it becomes available after completing the current task. Similarly, a programmable command processor, in the GPU in front of the main GPU pipeline, could similarly decide which tasks of all observed task queues will occupy the whole GPU when it becomes available. Previously, only one task is let into main GPU pipeline at a time such that all tasks are serialized and no performance benefits could be obtained if a task underutilizes GPU resources. Additionally, performing asynchronous support without using the GPU core blocks by multiple tasks concurrently may not yield any performance benefits.

Architectures may support both asynchronous priority queues and allow multiple tasks to execute on the GPU simultaneously. This may provide performance benefits. Due to concurrent execution, the total time to complete all tasks gets smaller. This may provide an additional bonus of power saving, since the GPU can be power collapsed once the tasks complete, which reduces leakage power. In an example, different tasks may utilize different shader processors simultaneously. Thus, before asynchronous computing support in APIs such as DX12, resources may be underutilized (e.g., as not all shader processors were involved). As described in more detail, this disclosure describes example techniques for a GPU to be more processing efficient where resources are more effectively utilized.

In an example, tile-based rendering may be performed in several steps called a binning pass operation. For example, a GPU implementing a tile-based architecture may initially process, or preprocess, an entire scene during a binning pass to define a number of bins, also referred to as "tiles" and may generate polygons (e.g., triangles) that make up the scene and sort them into the bins. The binning pass may be followed by one or more rendering passes, during which pixel values are generated and each of the defined tiles are rendered for display. During the rendering pass a vertex shader may be used to perform a vertex transformation and a fragment shader is used for pixel/fragment processing. The binning pass may use only a vertex shader for visibility determination. In some examples a binning vertex shader is a simplified version of rendering vertex shader and in some examples may fit within the resource footprint of a rendering vertex shader. This may allow for a guest/host scheme to operate. The binning pass precedes a rendering pass as the binning pass generates visibility information used during rendering. The binning pass may severely underutilizes GPU resources when run. When the binning pass for the next frame is performed in parallel on the GPU with the rendering pass of the current frame, substantial performance benefits can be seen without overloading the GPU. For example, during a binning pass operation, GPU hardware (HW) resources are often severely underutilized, as a position component of a vertex shader is typically relatively simple (e.g., brief operations and/or less resource utilization), and many resources, such as texture engines are not used at all. On the other hand, during a rendering pass, not all resources may be used either. Thus, techniques of the present disclosure disclose ways to overlap binning pass of the next frame with the rendering pass of the current frame.

Concurrent execution of multiple tasks, and, in particular, to accomplish an overlap of a binning position shader with rendering may be accomplished. For example, a GPU has a number of task states. A GPU may wait for a current job to complete execution. Then a GPU may reprogram the state (and may use a double buffer to increase the efficiency) and must wait even the GPU does not need the result of the current job.

Multiple different tasks may be executed concurrently and preempted by a prioritized execution of tasks on a shader processor. A driver operating on a CPU may prepare the configurations for a plurality of shaders. Execution commands for each of the shaders may go into separate queues or they may be placed in a single queue. In the example of a single queue, the GPU's command processor may handle two pointers into the single queue with one going far ahead to reach to "guest" task portion there. Regardless of whether a single queue or multiple queues are used, both tasks (shaders) may become visible to the GPU (in some examples the shader processor views these tasks). Arbitration at the GPU/shader processor may allow the "guest" tasks to run while the "normal" task is still running.

In another example operation, a driver configures GPU resources for a first shader according to the resource needs of the first shader, that executes "normally." A second (e.g. high priority) shader executes on a GPU by being programmed by a driver to use resources originally allocated to the first shader. The second shader that uses resources originally allocated to a first shader may be called a "guest" shader. The first shader that has had its resources used by the guest shader may be called a "host" shader. In an example, host shaders may be low priority shaders and guest shaders may be high priority shaders. Guest shader resource use may be limited to the footprint of the host shader that it preempts. Resource control of the guest shader may be handled by the Application (using the API), the driver, or a controller/command processor on the GPU. Additional resources may be obtained by a guest shader through software-programmable means (e.g., a bindless mechanism) at runtime. When a host shader is compiled, the compiler or the driver may determine the register footprint of the host shader, which (among other things) may result in a certain maximum number of waves (concurrent groups of execution threads) that can coexist at any time (e.g., the foot print is such that a GPU can execute up to 8 waves concurrently). A host shader (or controller on the GPU) may be preempted by the driver to allow a guest shader to occupy one or more of the wave slots assigned to the host shader. The guest shader(s) may not change the resource (e.g., register) footprint and guest shader(s) may only use wave slot(s) within the resource (e.g., register) footprint of the host shader that it preempts.

A bindless mechanism may allow shader code being executed (by a GPU) to fetch and install resources to be used by the shader, for example texture descriptors, constant buffers, etc. In some examples, a resource is indexed as an offset in a root descriptor table, the root descriptor table being configured before shader execution and may be shared by different shaders. A shader may pass an offset to HW and HW may use the root descriptor table to locate resource parameters in memory, fetches them and configures itself. This way no explicit driver configuration is needed prior to shader execution. Thus, to configure HW for a different shader execution one may only need to replace a root descriptor table pointer (or, in another example, maintain two table pointers for two concurrent task types). In an example, the offset may be relatively large, for example, 32 bit or relatively small, for example, a 5-7 bit offset for legacy resource indexing schemes.

In an alternative implementation where the host/guest shader pairs are known a priori (e.g., in advance), the compiler may choose to compile both shaders at the same time and arrive at a register footprint that can accommodate the performance needs of both shaders.

Guest shaders, in an example, cannot reconfigure any resources that are used by the host shader. This means that the number of configuration registers and/or local memory size for a guest shader may be smaller than used by a host shader. For example, a guest shader may have its own first executable instruction address register value, but may not have its own footprint register value). Other resources, such as textures and constant buffers may be limited in guest shaders which may only use bindless resources for certain memory uses. For example, a guest shader may need a pointer to its own root descriptor table, but, may not deal with any other resources. Guest shaders may be further restricted from using local memory. Guest shaders may not be configured with information indicating how many waves can be executed concurrently, so barrier operations may not be allowed as well.

Additionally, not every candidate host shader (or a driver controlling execution of a candidate host shader) may be preempted by a candidate guest shader. For example, a candidate host shader that has a large register footprint may cause a decrease in performance of the candidate host shader if a candidate guest shader was allowed to share already limited resources. In such an instance, the driver may not configure the candidate guest shader as a guest shader or may preempt a different candidate host shader with the candidate guest shader.

Table 1 shows a number of host and guest shader types.

TABLE 1

| Host Shader | Guest Shader |
| --- | --- |
| VS (vertex shader) | CS (compute shader), bindless everything |
| FS (fragment shader) | FS, bindless everything |
| FS | CS, bindless everything, no LM (local memory), no barriers |
| CS | CS, bindless everything, no LM, no barriers |

In an example involving a binning pass, a GPU may support a VS-host and a CS-guest shader. A binning position shader may be transformed to a CS that does not use either LM or barriers, and be executed as a guest shader while a host shader executes rendering pass of the previous frame.

Resource sharing rules may use a flexible mechanism. For example, (1) if the host shader does not use LM, it may be permissible for the guest shader to use LM, if a host shader uses known space within LM and the guest shader needs only a small amount of LM that will still fit within the LM, these shaders may execute concurrently; (2) a driver can, on behalf of a host shader, specify the maximum number of waves slots that a guest shader may use; and (3) a guest shader with larger footprint may be allowed, by the driver, to execute alongside host shader with smaller footprint, provided that multiple, consecutive wave slots are available. Similar trade-offs between flexibility and complexity can be applied for each kind of resource to find the right balance (e.g., maximum performance/power benefits at minimum area/complexity costs).

After each shader is compiled its resource use may be known. A driver may provide additional state information that may configure each shader processor (SP) for each host shader to instruct a GPU, command processor, and/or shader processor which resources are allowed to be shared and how much of that resource to share for guest shader use. For example, a driver might know that host shader uses LM but does not know how much it might be using at compilation time. Arbitration logic may then be configured to prevent sharing LM resource and allow only guest shaders that use no LM preempt a host shader.

Exposing the guest shader mechanism to applications and APIs may be accomplished in a variety of ways. For example, binning position shaders may not require the application to be aware of the use of the guest shader mechanism. That is, in an example, the API may not include low level functionality such that application level programs can control shader preemption. However, in other examples, host/guest shader capabilities may be exposed to the application (via, e.g., the API), preemption of shader programs may be restricted to the kind of shaders that may be used as guest shaders. This may avoid potential pitfalls, such as: (1) a current host shader is preempted by a guest shader to run; (2) the guest shader runs longer (or uses more resources over a particular period of time) than host shader; (3) the next host shader may need all the resources, and does may not allow a guest shader to run; and (4) the next host shader may stall and have to wait until a guest shader completes. These pitfalls may be solved with proper specification guarantees. For example, if guarantees are not satisfied, implementation may launch a user-specified guest shader as a "regular" shader (overriding the decision of the Application via the API instruction), which may still operate however it may not provide performance and power benefits.

In an example, with larger SPs and more arithmetic logic units (ALUs) multiple guests shaders may be instructed by a driver to coexist with a host shader. A driver operating on a CPU or a command processor operating on a GPU (with instruction from the driver) may instruct a shader processor to execute different shaders execute for different waves.

FIG. 1 is a block diagram illustrating an example device for processing data in accordance with one or more example techniques described in this disclosure for resource sharing in GPU shader subsystem. FIG. 1 illustrates device 10, examples of which include, but are not limited to, video devices such as media players, set-top boxes, wireless communication devices, such as mobile telephones, personal digital assistants (PDAs), desktop computers, laptop computers, gaming consoles, video conferencing units, tablet computing devices, and the like.

In the example of FIG. 1, device 10 includes processor 12, graphics processing unit (GPU) 14, and system memory 16. In some examples, such as examples where device 10 is a mobile device, processor 12 and GPU 14 may be formed as an integrated circuit (IC). For example, the IC may be considered as a processing chip within a chip package, such as a system on chip (SoC). In some examples, processor 12 and GPU 14 may be housed in different integrated circuits (e.g., different chip packages) such as examples where device 10 is a desktop or laptop computer. However, it may be possible that processor 12 and GPU 14 are housed in different integrated circuits in examples where device 10 is a mobile device.

Examples of processor 12 and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing (e.g., a SIMD processor). In some instances, GPU 14 may also include general purpose processing capabilities, and may be referred to as a general purpose GPU (GPGPU) when implementing general purpose processing tasks (i.e., non-graphics related tasks).

For purposes of illustration, the techniques described in this disclosure are described with GPU 14. However, the techniques described in this disclosure are not so limited. The techniques described in this disclosure may be extended to other types of parallel processing units (e.g., processing units that provide massive parallel processing capabilities, even if not for graphics processing). Also, the techniques described in this disclosure may be extended to processing units not specifically configured for parallel processing.

Processor 12 may execute various types of applications. Examples of the applications include operating systems, web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing. System memory 16 may store first shader program 34 and second shader program 32.

In general, processor 12 may offload processing tasks to GPU 14, such as tasks that require massive parallel operations. As one example, graphics processing requires massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include the DirectX® API by Microsoft®, the OpenGL®, OpenGL ES®, or Vulkan®, by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API and processor 12 and GPU 14 may utilize any technique for communication.

Device 10 may also include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Display 18 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 18. Transceiver module 22 may include circuitry to allow wireless or wired communication between device 10 and another device or a network. Transceiver module 22 may include modulators, demodulators, amplifiers and other such circuitry for wired or wireless communication.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor. System memory 16 may include portions reserved for use by GPU 14 and related functions. System memory 16 may include portions reserved for use by processor 12.

In some aspects, system memory 16 may include instructions that cause processor 12 and/or GPU 14 to perform the functions ascribed in this disclosure to processor 12 and GPU 14. Accordingly, system memory 16 may be a computer-readable storage medium having instructions stored thereon that, when executed, cause one or more processors (e.g., processor 12 and GPU 14) to perform various functions.

In some examples, system memory 16 may be a non-transitory storage medium. The term "non-transitory" may indicate that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

For example, as described in more detail elsewhere in this disclosure, system memory 16 may store the code for a compiler that executes on processor 12 that performs techniques of one or more examples described in this disclosure. System memory 16 may also store code for shader programs (e.g., a vertex shader, a pixel or fragment shader, tessellation-related shaders, a compute shader, etc.) that execute on a shader core (also referred to as a shader processor) of GPU 14.

The term graphics item is used in this disclosure to refer to a base unit on which GPU 14 performs parallel processing. GPU 14 may process a plurality of graphics items in parallel (e.g., at the same time). For example, a vertex shader may process a vertex, and GPU 14 may execute a plurality of instances of the vertex shader in parallel to process a plurality of vertices at the same time. Similarly, a pixel or fragment shader may process a pixel of a display, and GPU 14 may execute a plurality of instances of the pixel shader in parallel to process a plurality of pixels of the display at the same time. A vertex and a pixel are examples of a graphics item. For non-graphics related applications, the term "work item" may refer to smallest unit on which GPU 14 performs processing.

As will be explained in more detail below, according to various examples of the disclosure, processor 12 may be configured to compile a plurality of shader programs to be sent to and executed on GPU 14. At compile time, the resource requirements (e.g., bounded resource requirements) of each shader program may be known as well as the priority of the particular shader operation. Priority of the shader operation may be based on how quickly a result will be needed, how critical the completion of the shader operation is to the overall operation, and/or the purpose of the shader. For example, a binning vertex shader is generated automatically to support binning and may be known by a graphics driver as a lower priority task if overlapped with a main rendering task. A timewarp shader may be explicitly specified by the application known by the graphics driver (or signaled by the application) to be of high priority or requiring a particular maximal time to complete. In this example, priority is determined either by API semantic (for the timewarp shader) or by the internal operation of the driver (for the binning shader). The resource requirements refer to a determination of how many memory registers the shader program will utilize, how many instances of the shader program can execute in parallel, required local memory size, and time to execute the instructions of the shader program, etc. For instance, the compiler may retrieve information indicating the characteristics of GPU 14 or may be pre-configured with information indicating the characteristics of GPU 14. The characteristics may include information such as the number of processing elements on GPU 14, the number of memory registers within GPU 14, the size of the memory registers, and other such information.

The compiler uses such information as part of the compiling of the shader program. For example, during the compiling, the compiler may assign memory registers where intermediate data generated during the execution of the shader program is stored. In the compiling, the compiler may assign memory registers based on the information of the number and size of the memory registers of GPU 14. The compiler may similarly use other information for compiling GPU 14. Therefore, at the end of the compiling, the amount of resources the shader program will utilize may be determined by the compiler because the compiler assigned resources of GPU 14 for the shader program to execute.

Processor 12 may use multiple queues (or a single priority queue), resident on memory accessible by GPU 14 (e.g., system memory 16 or memory in GPU 14), where shader programs wait to be selected to have their resources allocated and then run on a shader processor on GPU 14. One or more shaders may be in a low priority queue and a resource footprint may be allocated to GPU 14 to execute on one or more shader processors on GPU 14. A driver or an application (via e.g., an API) executing on processor 12, may determine a priority for the high priority shader and low priority shader. A driver or an application (via e.g., an API) executing on processor 12, may determine whether the high priority shader may be executed as a guest shader by e.g., determining whether the required resource footprint of the high priority shader is smaller than (or equal to) the resource footprint of the low-priority shader (e.g., candidate host shader). If not, the high priority shader will remain in the queue until it can be allocated resources and executed in a conventional fashion. If the high priority shader is suitable as a guest shader, a driver executing on processor 12 may allow the current thread of the current shader to finish execution (so, e.g., as not to obviate storage of intermediate values and state information of a shader) and without reconfiguring the resource allocation of the host shader (as, e.g., the guest shader uses the resources allocated to the host shader), allocate the resources required by the guest (high priority) shader on GPU 14. The driver executing on processor 12 may alter the entry point (e.g., instruction start address plus pointer) of the host shader in the root descriptor table in GPU 14 with the entry point of the guest shader.

The driver or a task scheduler executing on processor 12 may instruct a command processor executing on GPU 14 to arbitrate the execution and timing of the execution of a particular shader as host and/or a guest shader. For example, the driver may instruct the command processor to schedule and process shaders on one or more priority queues. The command processor executing on GPU 14 may, based on resource usage conditions including the completion of a wave of execution in one or more shader cores and the priority of shaders within the queue(s), may instruct control units within one or more shader cores to execute the guest shader either concurrently with or instead of the host shader.

Once processor 12 determines that processing elements of the shader processor are available based on the resources configured for the host shader, the guest (high priority) shader may be executed. Processor 12 may also configure bindless resources for the host and guest shaders at the respective shader runtime. Following execution of the guest (high priority) shader, the host shader may be queued for execution and then executed by processor 12. Resources for execution of the host shader would not require reconfiguration of resources on GPU 14.

The use of the guest shader mechanic may enable the high priority shader to execute quickly without preempting or evicting the currently executing thread/wave. Instead, processor 12 allows a guest shader to "steal" or "borrow" resources (e.g., shader processor elements, memory registers, etc.) allocated to the host shader. Once the guest (high priority) shader has completed execution, GPU 14 resumes execution of the host (low priority) shader without a need to reallocate resources (as resources were not reallocated for the guest shader).

In an example, the host (low priority) shader may be a rendering vertex shader of a previous frame of video data and the guest (high priority) shader may be a binning pass vertex shader for a current frame of the video data. Such shaders may be executed concurrently (i.e., in parallel) on a shader processor on GPU 14. In another example, the guest (high priority shader) may comprise a virtual reality time warping operation.

Figure 2:
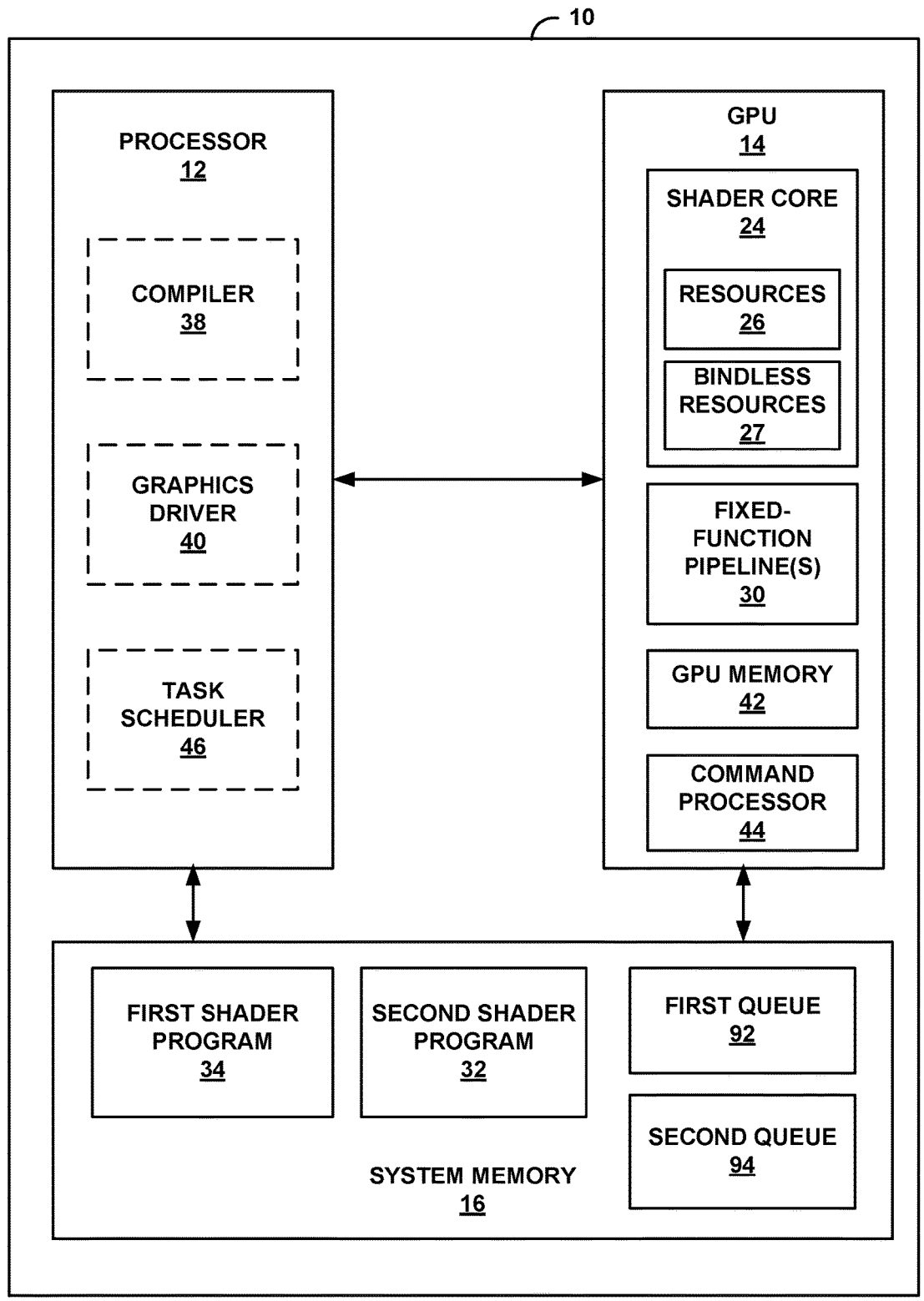
FIG. 2 is a block diagram illustrating components of the device illustrated in FIG. 1 in greater detail.

FIG. 2 is a block diagram illustrating components of the device illustrated in FIG. 1 in greater detail. As illustrated in FIG. 2, GPU 14 includes one or more shader cores 24 which includes resources 26 and bindless resources 27. Resources 26 may include general purpose registers (GPRs) (e.g., a single GPR, a GPR file, and/or a GPR bank), uniform GPR (uGPR) (e.g., a single uGPR, a uGPR file, and/or a uGPR bank), constant memory, local memory, texture pointers, local memory and constant buffers. GPU 14 also includes fixed-function pipeline(s) 30, GPU Memory 42, and command processor 44. Shader core 24 and fixed-function pipeline(s) 30 may together form a processing pipeline used to perform graphics or non-graphics related functions. The processing pipeline performs functions as defined by software or firmware executing on GPU 14 and performs functions by fixed-function units that are hardwired to perform specific functions. Such fixed-function pipelines 30 of GPU 14 may include a texture pipeline, a tessellation stage, clipping that fall outside the viewing frustum, and lighting.

The software and/or firmware executing on GPU 14 may be referred to as shader programs (or simply shaders), and the shader programs may execute on shader core 24 of GPU 14. Although only one shader core 24 is illustrated, in some examples, GPU 14 may include two or more shader cores similar to shader core 24. Fixed-function pipeline(s) 30 includes the fixed-function units. Shader core 24 and fixed-function pipeline(s) 30 may transmit and receive data from one another. For instance, the processing pipeline may include shader programs executing on shader core 24 that receive data from a fixed-function unit of fixed-function pipeline 30 and output processed data to another fixed-function unit of fixed-function pipeline 30.

Shader programs provide users and/or developers with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

Examples of the shader programs include a first shader program 34 and a second shader program 32. In an example, the first shader program 34 may be a low priority shader program and second shader program 32 may be a high priority shader program. Shader programs 32 and 34 may include shader programs for graphics related tasks and/or non-graphics related tasks and may include vertex shaders, fragment (pixel) shaders, compute shaders, geometry shaders and tessellation-related shaders.

Graphics driver 40 executing on processor 12 may be configured to implement an application programming interface (API); although graphics driver 40 does not need to be limited to being configured in accordance with a particular API. In such examples, the shader programs 32 and 34 may be configured in accordance with an API supported by graphics driver 40. In an example where device 10 is a mobile device, graphics driver 40 may be configured in accordance with the OpenGL ES API. The OpenGL ES API is specifically designed for mobile devices. In an example where device 10 is a non-mobile device, graphics driver 40 may be configured in accordance with the OpenGL API. Other API examples include the DirectX family of APIs by the Microsoft Corporation. Although not illustrated, system memory 16 may store the code for graphics driver 40 that processor 12 retrieves from system memory 16 for execution. Graphics driver 40 is illustrated in a dashed box to indicate that graphics driver 40 is software, executing on hardware (e.g., processor 12), in this example.

Graphics driver 40 may be configured to allow processor 12 and GPU 14 to communicate with one another. For instance, when processor 12 offloads graphics or non-graphics processing tasks to GPU 14, processor 12 offloads such processing tasks to GPU 14 via graphics driver 40.

As an example, processor 12 may execute a gaming application that produces graphics data, and processor 12 may offload the processing of this graphics data to GPU 14. In this example, processor 12 may store the graphics data in system memory 16, and graphics driver 40 may instruct GPU 14 with when to retrieve the graphics data, from where to retrieve the graphics data in system memory 16, and when to process the graphics data. Also, the gaming application may require GPU 14 to execute one or more shader programs. For instance, the gaming application may require shader core 24 to execute shader programs 32 and 34 to generate images that are to be displayed (e.g., on display 18 of FIG. 1). Graphics driver 40 may instruct GPU 14 when to execute the shader programs and instruct GPU 14 with where to retrieve the graphics data needed for the shader programs. In this way, graphics driver 40 may form the link between processor 12 and GPU 14. System memory 16 may include a first queue 92 and a second queue 94. In an example, first queue 92 is a high priority queue that may hold a high priority shader such as first shader program 34 while the shader program awaits execution by GPU 14. In this example, second queue 94 is a low priority queue that may hold a low priority shader such as second shader program 32 while the shader program awaits execution by GPU 14. In another example, GPU memory 42 may include first queue 92 and second queue 94.

In some examples, system memory 16 may store the source code for one or more of shader programs 32 and 34. In these examples, compiler 38 executing on processor 12 may compile the source code of these shader programs to create object or intermediate code executable by shader core 24 of GPU 14 during runtime (e.g., at the time when shader programs 32 and 34 are to be executed on shader core 24). In some examples, compiler 38 may pre-compile the shader programs and store the object or intermediate code of the shader programs in system memory 16.

In accordance with the techniques of this disclosure, compiler 38 (or in another example graphics driver 40) running on processor 12 may compile shader programs 32 and 34. Compiler 38 may receive code to compile from a program executing on processor 12. Compiler 38 and/or driver 40 may determine a priority of a shader and which resources the shader requires (resource footprint). The resource footprint may include any resources in resources 26 that is assigned (e.g., bound) to shader programs 32 and 34. In an example, the resource footprint also include all resources stored in bindless resources 27, which may be allocated to shader programs 32 and 34 at runtime. In another example, shader core 24 or processing elements on shader core 24 may be part of the resource footprint of a shader program. Processor 12 (in an example, via graphics driver 40) may transmit shader priority and resource footprint information to GPU 14 and shader core 24. In some examples, the priority and footprint information may be part of the compiled code, and in some examples, processor 12 may separately transmit the priority and footprint information.

Shader core 24 may be configured to execute many instances of the same instructions of the same shader program in parallel. For example, graphics driver 40 may instruct GPU 14 to retrieve, for example, vertex values for a plurality of vertices, and instruct GPU 14 to execute a vertex shader program (e.g., shader program 32 or 34) to process the vertex values of the vertices. In this example, shader core 24 may execute multiple instances of shader programs 32 or 34, and do so by executing one instance of shader programs 32 or 34 on one processing element of shader core 24 for each of the vertices over one or more threads over one or more waves. A particular instruction executing on a particular processing element of shader core 24 is referred to as a thread or a fiber. A group of threads may be referred to as a wave or warp. All of the processing elements of shader core 24 together that execute a warp may be referred to as a vector processing unit, where each lane (e.g., processing element) of the vector executes one thread. Resources 26 may be bound to a particular shader and/or thread and/or wave. Bindless resources 27 may be requested at runtime by the shader program 32 or 34 assigned by driver 40 on CPU 12 (called a bindless mechanism as the resources are not assigned or bound to a particular thread or shader program until runtime).

Driver 40 may be configured to load shader programs 32 and 34 from system memory 16 and/or from processor 12 (via compiler 38 and/or graphics driver 40) onto shader core 24 of GPU 14. Driver 40 may be configured to load (enqueue) one or more of first shader program 34 into second queue 94. In an example, a low priority shader program may be enqueued into a low priority queue. Resources 26 on GPU 14 may be reserved for particular threads and waves of first shader program 34 by driver 40 on processor 12. Driver 40 may instruct GPU 14 to process the queue of low priority shader programs 34 in shader core 24 using resources 26 and bindless resources 27. Once executed, first shader program 34 may be dequeued from the second queue 94.

Driver 40 may be configured to load (enqueue) second shader program 32 into a first queue 92. Second shader program 32 may be determined to be a high priority program and loaded onto a high priority queue. The determination may be made by an application executing on processor 12 (via an API) and honored by driver 40 or determined by driver 40 directly. Driver 40 may determine the resource footprint of second shader program 32.

Task scheduler 46 may include a kernel mode driver (KMD) task scheduler. Task scheduler 46 may be configured to observe all task queues (first queue 92 and second queue 94) and determine which single task out of those queues will occupy GPU 14 when the current task is complete. In an example, task scheduler 46 may be configured to determine which task (e.g., first shader program 34, second shader program 32) will occupy the entirety of GPU 14. In another example, task scheduler 46 may be configured to determine which tasks will occupy different portions of GPU 14.

If the resource footprint of second shader program 32 (e.g., a high priority shader program) is less than the resource footprint of first shader program 34 (e.g., a low priority shader program) that had resources 26 reserved GPU 14 and/or shader core 24, driver 40 and/or task scheduler 46 may allow shader core 24 to complete execution of the current thread of first shader program 34. The current thread of first shader program 34 may be in the middle of a larger wave of execution of low priority shader program 34 on shader core 24 or it may be in the beginning or end of a wave of execution of first shader program 34. The completion of the execution of the thread of first shader program 34 allows the results of the first shader program 34 to be used (rather than, e.g., disposed of, which may require the thread to be rerun or have all of the state information stored which may require movement and use of a large amount of data, time, and power for storage and retrieval of the state information and resources 26 may have to be reconfigured). At the completion of the execution of the thread of first shader program 34, an instruction (e.g., an interrupt) may be sent from driver 40 or task scheduler 46 to a controller on shader core 24 or command processor 44 to instruct shader core 24 to load a thread of second shader program 32 as a guest shader, using the resources reserved for the thread or wave of the host shader (first shader program 34). By having the guest shader use resources allocated to the host shader, resources 26 may not have to be reconfigured for the guest shader. This may allow second shader program 32 (e.g., a high priority shader program) to execute sooner and may allow first shader program 34 (host shader, e.g., a low priority shader program) to resume execution following the execution of second shader program 32 as a guest shader. The guest shader (e.g., second shader program 32) may allocate additional bindless resources 27 on GPU 14 via a bindless mechanism via driver 40.

Some resources 26, allocated to the host shader (e.g., first shader program 34) may be reserved for the host shader only. These resources 26 may include local memory, texture pointers, and constant buffers. Instead of these resources, a guest shader (e.g., second shader program 32) may use bindless resources 27 that are allocated at runtime by driver 40. In another example, the guest shader may use unused portions of the local memory allocated to the host shader.

If second shader program 32 (candidate guest shader) has a larger resource footprint (or larger in any particular resource of the resource footprint) than the first shader program 34 (candidate host shader), then the high priority shader program will not be executed and resources will not be taken from the low priority shader program 34. In an example, the foregoing system may be used to perform binning and rendering pass operations for rendering video in parallel (e.g., simultaneously). In an example, first shader program 34 may be configured to perform the operations of a rendering vertex shader of a previous frame of video data. Second shader program 32 may be configured to perform the operations of a binning pass vertex shader for a current frame of the video data. Such shaders may be executed concurrently (i.e., in parallel) on shader core 24 on GPU 14. An application program may signal via an API to compile the binning shader and the rendering shader by compiler 38. The application program may also signal that the binning pass operation be denoted a high priority shader. In an example, the rendering pass operation may be denoted a low priority shader. Driver 40 may enqueue the rendering pass shader (e.g., first shader program 34) onto second queue 94. Driver 40 may then enqueue the binning pass shader (e.g., second shader program 32) onto first queue 92. Driver 40 may allocate resources 26 for a plurality of copies (e.g., threads and/or waves) of the rendering pass shader (e.g., first shader program 34), e.g., for use on different vertex data, as multiple threads and/or waves and prepare the plurality of copies of the rendering pass shader, e.g., first shader program 34, execution during the next wave by shader core 24 on GPU 14. Task scheduler 46 may determine, based on viewing the binning and rendering pass operations in first queue 92 and second queue 94 that the rendering pass shader should occupy GPU 14. Driver 40 may send an interrupt to shader core 24 and/or command processor 44 to load one or more threads and/or waves of the binning pass shader (e.g., second shader program 32) for execution by shader core 24 using the resources allocated to first shader program 34, e.g. the rendering pass shader, without allocating resources for second shader program 32, e.g. the binning pass shader. That is, threads of first shader program 34, e.g. the rendering pass shader, are treated as a host shader and allocated resources to the threads of first shader program 34 are "borrowed" by one or more threads of second shader program 32, e.g. the binning pass shader.

At the completion of the current wave, shader core 24 and/or command processor 44 may determine resources are available to execute the rendering pass shader as a guest shader. Shader core 24 may then execute one or more threads of first shader program 34 (e.g., the rendering pass shader) concurrently with one or more threads of second shader program 32 (e.g., the binning pass shader). During execution, either first shader program 34 or second shader program 32 may allocate additional bindless resources 27 via a request from driver 40 by shader core 24. Once shader core 24 completes execution of the current wave of one or more threads of first shader program 34 (e.g., the rendering pass shader) and one or more threads of second shader program 32, driver 40 may direct shader core 24 to load the unexecuted host shader (the threads of first shader program 34, e.g., the rendering pass shader) for execution during the following wave without reallocating resources.

In another example, the guest (high priority shader) may comprise a virtual reality time warping operation.

In an example, a high priority queue (e.g., first queue 92), designation of high priority shader programs and/or the guest shader mechanism may be limited to particular types of shaders e.g., vertex or compute shaders.

Figure 3:
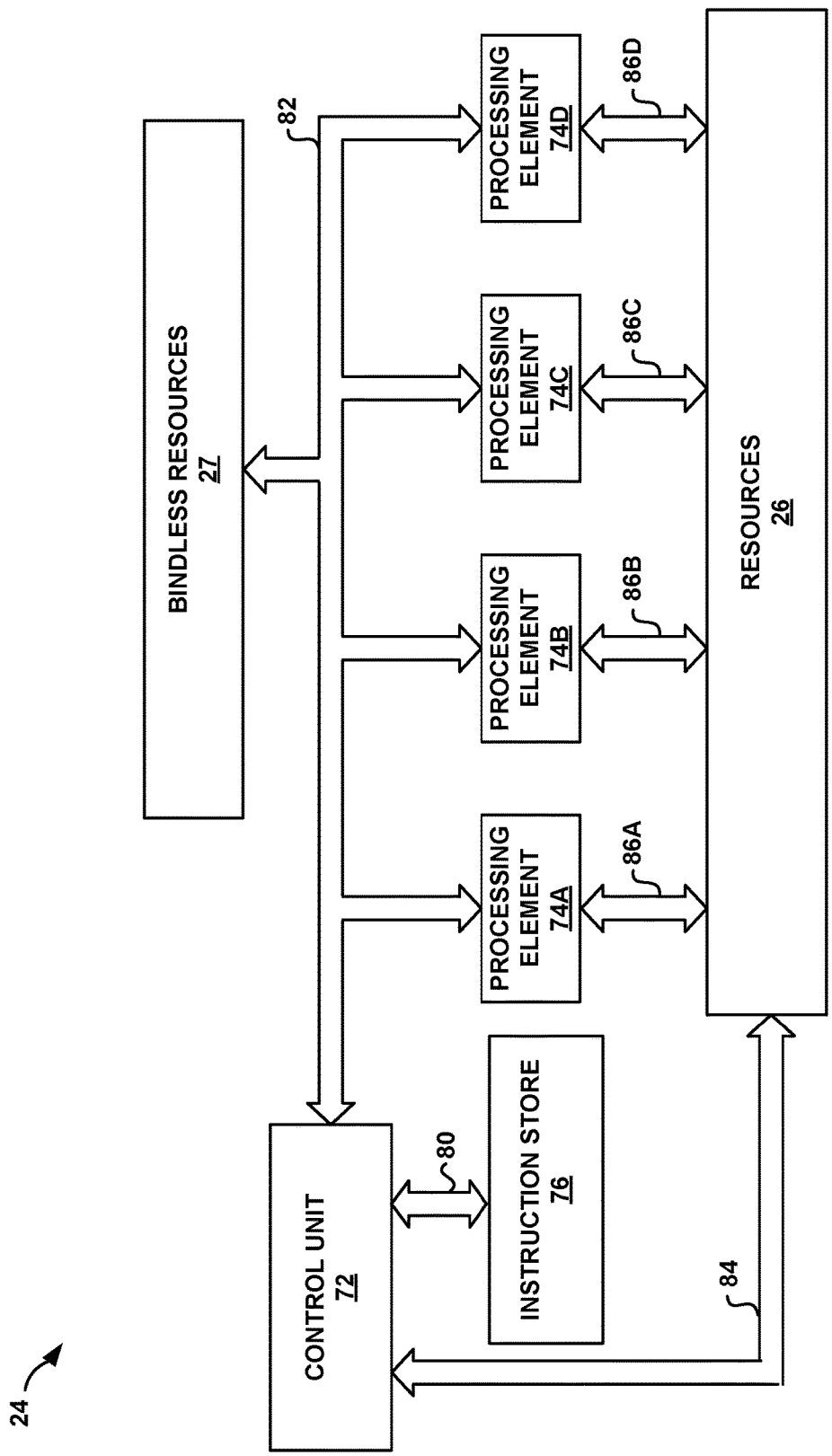
FIG. 3 is a block diagram of an example shader core of the GPU of FIG. 1 in more detail.

FIG. 3 is a block diagram illustrating an example configuration of shader core 24 of GPU 14 that may be used to implement the techniques for resource sharing in GPU shader subsystem of this disclosure. GPU 14 is configured to execute instructions for a program in a parallel manner. GPU 14 includes a shader core 24 that includes a control unit 72, processing elements 74A-74D (collectively "processing elements 74"), instruction store 76, resources 26, bindless resources 27, and communication paths 80, 82, 84, 86A-86D. Communication paths 86A-86D may be referred to collectively as "communication paths 86." In some examples, GPU 14 may be configured to execute a plurality of threads of execution for a wave of a program (e.g., shader) using processing elements 74. A thread may be the smallest sequence of programmed instructions that can be managed independently by control unit 72 and/or driver 40.

Control unit 72 is communicatively coupled to instruction store 76 via communication path 80, to processing elements 74 via communication path 82, and to resources 26 (e.g., GPR) via communication path 84. Control unit 72 may use communication path 80 to send read instructions to instruction store 76. A read instruction may specify an instruction address in instruction store 76 from which an instruction should be retrieved. Control unit 72 may receive one or more program instructions from instruction store 76 in response to sending the read instruction. Control unit 72 may include an instruction sequencer and may fetch instructions from instruction store 76, decoding them and instructing particular processing elements 74 (e.g., an ALU, a control flow unit, a load/store unit etc) to read particular GPRs (e.g., in resources 26) and perform operation requested by the instruction.

Each of processing elements 74 may be configured to process instructions for the program stored in instruction store 76. In some examples, each of processing elements 74 may be configured to perform the same set of operations or different sets of operations. For example, each of processing elements 74 may implement the same instruction set architecture (ISA). In additional examples, each of processing elements 74 may be an arithmetic logic unit (ALU). In further examples, GPU 14 may be configured as a vector processor, and each of processing elements 74 may be a processing element within the vector processor.

The operations performed by processing elements 74 may include arithmetic operations, logic operations, comparison operations, etc. Arithmetic operations may include operations such as, e.g., an addition operation, a subtraction operation, a multiplication operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in resources 26 and bindless resources 27.

Each of processing elements 74 may be configured to perform an operation in response to receiving an instruction from control unit 72 via communication path 82. In some examples, each of processing elements 74 may be configured to be activated and/or deactivated independently of the other processing elements 74. In such examples, each of processing elements 74 may be configured to perform an operation in response to receiving an instruction from control unit 72 when the respective processing element 74A-74D is activated, and to not perform the operation in response to receiving the instruction from control unit 72 when the respective processing element 74A-74D is deactivated, i.e., not activated.

Instruction store 76 is configured to store a program for execution by GPU 14. The program may be stored as a sequence of instructions. In some examples, each instruction may be addressed by a unique instruction address value. In such examples, instruction address values for later instructions in the sequence of instructions are greater than instruction address values for earlier instructions in the sequence of instructions. The program instructions, in some examples, may be machine-level instructions. That is, in such examples, the instructions may be in a format that corresponds to the ISA of GPU 14. Instruction store 76 is configured to receive a read instruction from control unit 72 via communication path 80. The read instruction may specify an instruction address from which an instruction should be retrieved. In response to receiving the read instruction, instruction store 76 may provide an instruction corresponding to the instruction address specified in the read instruction to control unit 72 via communication path 80.

Instruction store 76 may be any type of memory, cache or combination thereof. When instruction store 76 is a cache, instruction store 76 may cache a program that is stored in a program memory external to GPU 14. Although instruction store 76 is illustrated as being within GPU 14, in other examples, instruction store 76 may be external to GPU 14, e.g., stored in system memory 16.

Resources 26 and bindless resources 27 are configured to store data items used by processing elements 74 (and the respective shader programs configured to run on the processing elements 74). In some examples, resources 26 and bindless resources 27 may include texture descriptors, texture sampler object descriptors, constant buffer descriptors, general purpose registers (GPRs) (e.g., a single GPR, a GPR file, and/or a GPR bank), uniform GPR (uGPR) (e.g., a single uGPR, a uGPR file, and/or a uGPR bank), constant memory (e.g., a constant register file), local memory, texture pointers, texture images and samplers, local memory and constant buffers. The resource footprint of first shader program 34 and second shader program 32 may include all of the resources (memory, processing elements) used by the respective shader program 32 or 34. When driver 40 determines that the resource footprint of second shader program 32 (e.g., guest shader candidate) is smaller or the same size as the resource footprint of the first shader program 34 (e.g., host shader candidate), the driver 40 may look at each resource used and determine whether each individual resource used by the second shader program 32 (guest shader candidate) is less than or equal to each individual resource used by the first shader program 34 (host shader candidate). A determination that the resource footprint of the second shader program 32 (e.g., guest shader candidate) is larger than the resource footprint of the first shader program 34 (e.g., host shader candidate), driver 40 may look at each resource used and determine that at least one of all the bound resources used by the second shader program 32 (guest shader candidate) is greater than the corresponding resources used by first shader program 34 (host shader candidate).

Control unit 72 is configured to receive signals from GPU 14, command processor 44, processor 12, driver 40 and/or task scheduler 46 to execute a shader program (such as first shader program 34 and second shader program 32). Driver 40 is configured to receive priority information regarding the shader program from an application executing on processor 12. In one example, priority information is sent to driver 40 from an application via an API call to specify particular semantic of the shader (such as timewarp). In another example, queue priority is specified at creation time. In a further example, priority is determined from an internal sematic of the shader that is known by the driver. For example, the priority of a shader may be determined by driver 40 by its function. Control unit 72 may receive an instruction (e.g., interrupt) from driver 40, command processor 44, and/or task scheduler 46 on processor 12 indicating that a particular shader program should be executed on a prioritized basis.

While there remains no shader programs to execute in first queue 92, driver 40, command processor 44, and/or task scheduler 46 may direct control unit 72 to instruct processing elements 74 to execute shader programs in second queue 94 (e.g., first shader program 34). Shader programs, such as first shader program 34 and second shader program 32 may be executed by shader core 24 a plurality of times over a plurality of threads by one or more processing elements 74 over a single or plurality of waves. Control unit 72, driver 40, command processor 44, and/or task scheduler 46 may be configured to schedule the execution of these threads and waves of shader programs by scheduling and allocating resources (such as, e.g., resources 26) to particular threads waiting to be executed in a queue (e.g., second queue 94). For example, if there are 100 of a resource (e.g., 100 GPRs) available in resources 26, and first shader program 34 uses 5 of the resource (e.g., 5 GPRs), then control unit 72 or driver 40 may allocate resources for up to 20 of the shader program. A guest shader, in this example, may use up to and including 5 bound resources (e.g., the 5 allocated GPRs). At runtime, the guest shader (or individual threads of the guest shader) may request an additional allocation of resources from bindless resources 27. When a thread completes, control unit 72, driver 40, command processor 44, and/or task scheduler 46 may reallocate the processing element of processing elements 74 and resources 26 for additional tasks (e.g., additional threads of the same or a different shader program on the second queue 94).

When driver 40 adds second shader program 32 into first queue 92, driver 40 may be configured to determine the resource footprint of the second shader program 32 as well as the resource allocation(s) of the currently executing low-priority threads (on processing elements 74) or a low-priority thread that has been allocated resources by control unit 72 but is waiting to be executed. If driver 40 determines that the resource footprint of a thread of the second shader program 32 is smaller (or the same size) than resources allocated to a currently executing (or allocated but waiting to be executed) thread, then driver 40 may treat the currently executing (or allocated but waiting to be executed) thread as a host shader and the thread of the second shader program 32 as a guest shader. In an example, when the host shader (e.g., the currently executing thread) completes execution, driver 40 and/or control unit 72 may load the guest shader resources into the resources 26 and execute the guest shader on the processing element of processing elements 74 used by the host shader. This may be done without reconfiguring the resource allocation of resources 26 for the guest shader from the allocation of the host shader. Additional resources needed by the guest shader may be allocated at runtime using bindless resources 27. Because the host shader completed execution before loading the guest shader, the result(s) of the host shader operation are usable (and do not have to be discarded due to preemption by second shader program 32) and intermediate state information of the host shader 32 does not need to be stored and then reloaded.

Driver 40 may determine that the host shader candidate cannot accommodate the resource footprint of the guest shader candidate. For example, if a candidate host shader is allocated 5 resources of a particular resource type (e.g., 5 GPRs), whereas the candidate guest shader requires 7 of the resource type (e.g., 7 GPRs), it may require fragmentation and reallocation of shader resources away from the original allocation and may require multiple wave fronts to complete execution. When driver 40, command processor 44, and/or task scheduler 46 determines that the resource footprint of second shader program 32 (e.g., guest shader candidate) is greater than the resource footprint of the first shader program 34 (e.g., host shader candidate), driver 40, command processor 44, and/or task scheduler 46 may attempt other low priority shader programs (e.g., other host shader candidates) to determine whether there is a suitable host shader for second shader program 32. If there is no suitable host shader, second shader program 32 may wait until a suitable host shader is found and a different guest shader candidate in first queue 92 is checked. Additionally, other preemption methods may be employed to run second shader program 32 if a suitable host shader is not found, for example, a forced host shader eviction.

In an example, the first shader program 34 is a rendering shader of a previous frame and the second shader program 32 is a binning position shader of a current frame. The first thread of the second shader program 32 may be executed concurrently with another thread of first shader program 34. This may allow more efficient utilization of the resources between shader programs 32 and 34. GPU 14 may be configured by driver 40 to execute first shader program 34 as a host shader. The configuration of first shader program 34 by driver 40 is to use all or substantially all of the processing resources on GPU 14 or shader core 24 of GPU 14. Driver 40 may add first shader program 34 to first queue 92. Task scheduler 46 running on processor 12 and/or command processor 44 on GPU 14 may decide which tasks will occupy GPU 14. Driver 40 may configure second shader program 32 for execution on GPU 14. Driver 40 may determine that the binning position shader should be prioritized add second shader program 32 to second queue 94. Task scheduler 46 and/or command processor 44 may observe queues 92 and 94 and resource utilization on GPU 14 to determine whether resources are available on the GPU to run on GPU 14. Based on availability of resources on GPU 14, task scheduler 46 and/or command processor 44 may configure GPU 14 to execute threads of second shader program 32 in place of threads of first shader program 34 on GPU 14. In an example, threads of the second shader program 32 and the first shader program 34 may run concurrently on GPU 14.

Although FIG. 3 illustrates a single element, resources 26, for storing data used by processing elements 74, in other examples, GPU 14 may include separate, dedicated data stores for each of processing elements 74. GPU 14 illustrates four processing elements 74 for exemplary purposes. In other examples, GPU 14 may have many more processing elements in the same or a different configuration.

Control unit 72 is configured by driver 40 to execute instructions for a shader program with instructions stored in instruction store 76. For each instruction or set of instructions of the program, control unit 72 may retrieve the instruction from instruction store 76 via communication path 80, and process the instruction. In some examples, control unit 72 may process the instruction by causing an operation associated with the instruction to execute on one or more of processing elements 74. For example, the instruction retrieved by control unit 72 may be an arithmetic instruction that instructs GPU 14 to perform an arithmetic operation with respect to data items specified by the instruction, and control unit 72 may cause one or more of processing elements 74 to perform the arithmetic operation on the specified data items. In further examples, control unit 72 may process the instruction without causing an operation to be performed on processing elements 74.

Control unit 72 may cause an operation to be performed on one or more of processing elements 74 by providing an instruction to processing elements 74 via communication path 82. The instruction may specify the operation to be performed by processing elements 74. The instruction provided to the one or more of processing elements 74 may be the same as or different than the instruction retrieved from instruction store 76. In some examples, control unit 72 may cause the operation to be performed on a particular subset of processing elements 74 (including by a single processing element) by one or both of activating a particular subset of processing elements 74 upon which the operation should be performed and deactivating another subset of processing elements 74 upon which the operation should not be performed. Control unit 72 may activate and/or deactivate processing elements 74 by providing respective activation and/or deactivation signals to each of processing elements 74 via communication path 82. In some examples, control unit 72 may activate and/or deactivate processing elements 74 by providing activation and/or deactivation signals to processing elements 74 in conjunction with providing an instruction to processing elements 74. In further examples, control unit 72 may activate and/or deactivate processing elements 74 prior to providing an instruction to processing elements 74.

Control unit 72 may execute a plurality of threads of execution for a program using processing elements 74. A plurality of threads to be executed in parallel is sometimes called a warp. Each of processing elements 74 may be configured to process instructions of the program for a respective thread of the plurality of threads. For example, control unit 72 may assign each thread of execution to an individual one of processing elements 74 for processing. The threads of execution for the program may execute the same set of instructions with respect to different data items in a set of data items. For example, processing element 74A may execute a first thread of execution for a program stored in instruction store 76 with respect to a first subset of data items in a plurality of data items, and processing element 74B may execute a second thread of execution for the program stored in instruction store 76 with respect to a second subset of data items in the plurality of data items. The first thread of execution may include the same instructions as the second thread of execution, but the first subset of data items may be different than the second subset of data items.

Figure 4:
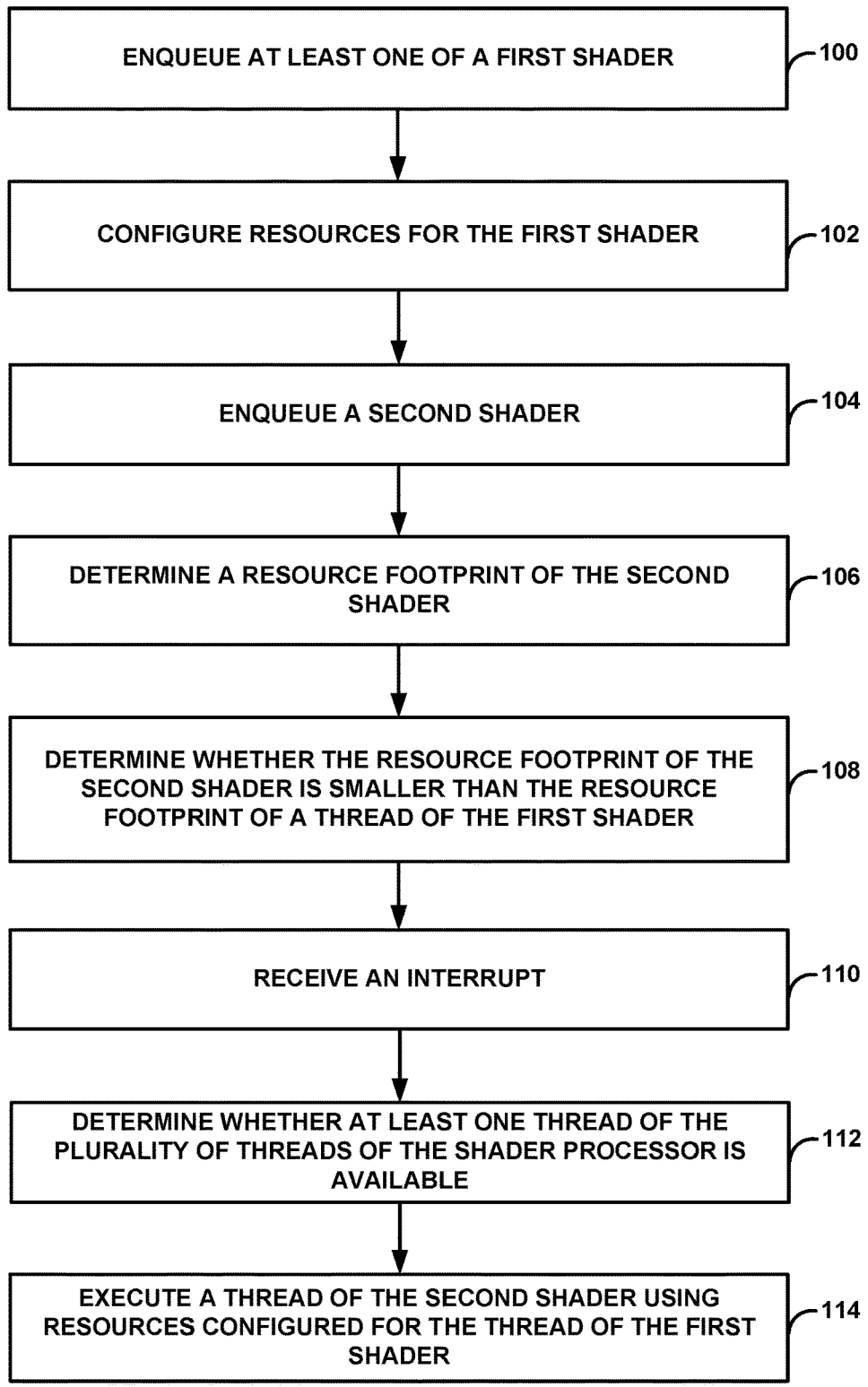
FIG. 4 is a flowchart illustrating an example technique of processing data in a GPU.

FIG. 4 is a flowchart illustrating an example method according to the techniques of this disclosure. The techniques of FIG. 4 may be implemented by one or more of GPU 14 and/or processor 12 (see FIGS. 1 and 2).

In one example of the disclosure, driver 40 executing on processor 12 may be configured to enqueue first shader program 34 onto second queue 94 (100). In an example, first shader program 34 may be a low priority shader. In another example, first shader program 34 may include a rendering pass operation for a previous frame of video data. Driver 40 executing on processor 12 may be further configured to configure resources for first shader program 34 on the shader core 24 (102). The configuration of resources 26 of first shader program 34 may be based on the resource footprint of first shader program 34. Resources 26 may include general purpose registers (GPRs) (e.g., a single GPR, a GPR file, and/or a GPR bank), uniform GPR (uGPR) (e.g., a single uGPR, a uGPR file, and/or a uGPR bank), constant memory (e.g., a constant register file), local memory, texture pointers, texture images and samplers, local memory and constant buffers.

Driver 40 executing on processor 12 may be configured to enqueue second shader program 32 onto first queue 92 (104). Driver 40 executing on processor 12 may be configured to determine a resource footprint of second shader program (106). Driver 40 or task scheduler 46 executing on processor 12 or command processor 44 on GPU 14 may be configured to determine whether the resource footprint of second shader program 32 is smaller than the resource footprint of a thread of first shader program 34 (108). Based on this determination driver 40 or task scheduler 46 executing on processor 12 or command processor 44 on GPU 14 may designate the thread of first shader program 34 as a host shader and the thread of second shader program 32 as a guest shader. The resources for the thread of first shader program 34 may have been previously configured by driver 40 executing on processor 12.

Shader core 24 on GPU 14 may be configured to receive an interrupt from graphics or task scheduler 46 executing on processor 12 or command processor 44 on GPU 14 (110). The interrupt may be sent from graphics driver 40 or task scheduler 46 executing on processor 12 or command processor 44 on a front end of GPU 14 to GPU 14 to alert GPU 14 that graphics driver 40 should load second shader program 32 for execution as a guest shader in place of the host shader, first shader program 34.

Command processor 44 on GPU 14 may determine whether at least one thread of the plurality of threads of the shader processor is available for additional processing work (112). This may occur after the thread of the first shader program 34 executes. GPU 14 may be configured to execute a thread of the second shader program 32 using resources configured for the thread of the first priority shader program 34 (114).

The execution of the thread of high priority shader program 32 by GPU 14 may be based on the determination that the at least one thread is available and the determination that the resource footprint of the second shader program 32 is smaller than (or equal to) the resource footprint of the first shader program 34. Executing by GPU 14 may occur without reconfiguring the resources configured for the thread of first shader program 34. Furthermore, executing by GPU 14 may occur without backing up the state information of the first thread of first shader program 34 or without discarding the results of execution of the thread of first shader program 34. At runtime, the guest shader (e.g., second shader program 32) may utilize resources separate from those configured for the first shader program 34 via a bindless mechanism of bindless resources 27 on GPU 14. Once the thread of second shader program 32 completes execution, further threads of second shader program 32 may execute. Further second shader program threads may execute as guest shaders as well. After the second shader program 32 completes execution, second shader program 32 may be dequeued from first queue 92. GPU 14 may be configured to then complete execution of further threads of first shader program 34. When first shader program 34 completes execution, first shader program 34 may be dequeued from second queue 94 by driver 40 executing on processor 12.

In an example, first shader program 34 a rendering shader (e.g., a vertex shader and/or fragment shader) of a previous frame and second shader program 32 is a binning position shader (e.g., a vertex shader) of a current frame. Executing the thread of second shader program 32 by GPU 14 may include executing the thread of second shader program 32 in parallel with another thread of first shader program 34.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for operating a graphics processing unit (GPU), the method comprising:
    allocating resources of a shader processor of the GPU for a first thread of a first shader based on a first resource footprint of the first shader;
    receiving information from a driver identifying a second shader;
    receiving an indication that a second resource footprint of the second shader is smaller than the first resource footprint of the first shader;
    determining whether one or more processing elements of the shader processor is available based on the resources allocated for the first thread; and
    based on the determination that one or more processing elements are available and the indication that the second resource footprint is smaller than the first resource footprint, executing a second thread of the second shader while using the resources allocated for the first thread of the first shader on the shader processor without reconfiguring the resources allocated for the first thread of the first shader.

2. The method of claim 1, wherein executing the second thread of the second shader comprises executing the second thread of the second shader after the first thread of the first shader completes execution.

3. The method of claim 1 further comprising:
    enqueuing the first shader onto a first queue for execution; and
    enqueuing the second shader onto a second queue for execution.

4. The method of claim 1, further comprising allocating resources via a bindless mechanism at runtime to the second shader apart from resources allocated for the first shader.

5. The method of claim 1, wherein the second shader comprises instructions for at least a portion of a virtual reality time warping operation.

6. The method of claim 1, wherein the first shader comprises a rendering vertex shader of a previous frame, and the second shader comprises a binning pass vertex shader of a current frame, wherein executing the second thread of the second shader comprises executing the second thread of the binning pass vertex shader in parallel with another thread of the rendering vertex shader.

7. The method of claim 1, further comprising based on executing the second thread of the second shader while using the resources allocated for the first thread of the first shader on the shader processor, executing a third thread of the first shader.

8. The method of claim 1, based on an indication that the second resource footprint is larger than the first resource footprint, executing a third thread of the first shader and not executing the second shader while using the resources allocated for the first thread of the first shader.

9. The method of claim 1, wherein the first resource footprint and the second resource footprint each comprise a plurality of individual resource types and determining whether the second resource footprint of the second shader is smaller than the first resource footprint of the first shader comprises determining whether the second resource footprint is smaller than the first resource footprint with respect to each of the plurality of individual resource types.

10. The method of claim 1, wherein executing the second thread of the second shader while using the resources allocated for the first thread of the first shader comprises executing the second thread of the second shader while using the resources allocated for the first thread of the first shader without backing up state information of the first thread of the first shader.

11. The method of claim 1, wherein the first shader comprises a low priority shader and the second shader comprises a high priority shader.

12. An apparatus comprising:
    a memory configured to store code for a first shader and a second shader; and
    a graphics processing unit (GPU) comprising a shader processor and a command processor, the command processor configured to:
        allocate resources of the shader processor for a first thread of the first shader based on a first resource footprint of the first shader;
        receive information from a driver identifying the second shader;
        receive an indication that a second resource footprint of the second shader is smaller than the first resource footprint of the first shader; and
        determine whether one or more processing elements of the shader processor is available based on the resources allocated for the first thread;
    the shader processor configured to, based on the determination that one or more processing elements are available and the indication that the second resource footprint is smaller than the first resource footprint, execute a second thread of the second shader while using the resources allocated for the first thread of the first shader without reconfiguring the resources allocated for the first thread of the first shader.

13. The apparatus of claim 12, wherein the shader processor configured to execute the second thread of the second shader comprises the shader processor configured to execute the second thread of the second shader after the first thread of the first shader completes execution.

14. The apparatus of claim 12 wherein the GPU is configured to:
enqueue the first shader onto a first queue for execution; and
enqueue the second shader onto a second queue for execution.

15. The apparatus of claim 12, wherein the command processor is configured to allocate resources via a bindless mechanism at runtime to the second shader apart from the resources allocated for the first shader.

16. The apparatus of claim 12, wherein the second shader comprises instructions for at least a portion of a virtual reality time warping operation.

17. The apparatus of claim 12, wherein the first shader comprises a rendering vertex shader of a previous frame and the second shader comprises a binning pass vertex shader of a current frame, and wherein the shader processor is configured to execute the second thread of the binning pass vertex shader in parallel with another thread of the rendering vertex shader.

18. The apparatus of claim 12, wherein the shader processor is configured to, based on the execution of the second thread of the second shader while using the resources allocated for the first thread of the first shader on the shader processor, execute a third thread of the first shader.

19. The apparatus of claim 12, wherein the shader processor is configured to, based on an indication that the second resource footprint is larger than the first resource footprint, execute a third thread of the first shader and not executing the second shader while using the resources allocated for the first thread of the first shader.

20. The apparatus of claim 12, wherein the first resource footprint and the second resource footprint each comprise a plurality of individual resource types and wherein the command processor is configured to determine whether the second resource footprint is smaller than the first resource footprint with respect to each of the plurality of individual resource types.

21. The apparatus of claim 12, wherein the shader processor is configured to execute the second thread of the second shader while using the resources allocated for the first thread of the first shader without backing up state information of the first thread of the first shader.

22. The apparatus of claim 12, wherein the first shader comprises a low priority shader and the second shader comprises a high priority shader.

23. A non-transitory computer-readable storage medium including instructions stored thereon that, when executed, cause at least one processor of to:
allocate resources of a shader processor of the GPU for a first thread of a first shader based on a first resource footprint of the first shader;
receive information from a driver identifying a second shader;
receive an indication that a second resource footprint of the second shader is smaller than the first resource footprint of the first shader;
determine whether one or more processing elements of the shader processor is available based on the resources allocated for the first thread; and
based on the determination that one or more processing elements are available and the indication that the second resource footprint is smaller than the first resource footprint, execute a second thread of the second shader while using the resources allocated for the first thread of the first shader on the shader processor without reconfiguring the resources allocated for the first thread of the first shader.

24. The non-transitory computer-readable storage medium of claim 23, wherein the first resource footprint and the second resource footprint each comprise a plurality of individual resource types and determining whether the second resource footprint of the second shader is smaller than the first resource footprint of the first shader comprises determining whether the second resource footprint is smaller than the first resource footprint with respect to each of the plurality of individual resource types.

25. The non-transitory computer-readable storage medium of claim 23, wherein the instructions, when executed, further cause at least one processor to execute the second thread of the second shader while using the resources allocated for the first thread of the first shader without backing up state information of the first thread of the first shader.

26. The non-transitory computer-readable storage medium of claim 23, wherein the first shader comprises a rendering vertex shader of a previous frame and the second shader comprises a binning pass vertex shader of a current frame and wherein the instructions, when executed, further cause at least one processor to execute the second thread of the binning pass vertex shader in parallel with another thread of the rendering vertex shader.

27. An apparatus for operating a graphics processing unit (GPU), the method comprising:
means for allocating resources of a shader processor of the GPU for a first thread of a first shader based on a first resource footprint of the first shader;
means for receiving information from a driver identifying a second shader;
means for receiving an indication that a second resource footprint of the second shader is smaller than the first resource footprint of the first shader;
means for determining whether one or more processing elements of the shader processor is available based on the resources allocated for the first thread; and
means for executing a second thread of the second shader while using the resources allocated for the first thread of the first shader on the shader processor based on the determination that one or more processing elements are available and the indication that the second resource footprint is smaller than the first resource footprint without reconfiguring the resources allocated for the first thread of the first shader.

* * * * *